(12) United States Patent
Hanson et al.

(10) Patent No.: US 8,196,454 B2
(45) Date of Patent: Jun. 12, 2012

(54) PORTABLE MULTI-FUNCTION SYSTEM FOR TESTING PROTECTIVE DEVICES

(75) Inventors: Eric Hanson, Ruxton, MD (US); Colin Gordon Hodge, Ellicott City, MD (US); Gilbert Olvera, New Windsor, MD (US)

(73) Assignee: Hamilton Associates, Inc., Owings Mill, MD (US)

( * ) Notice: Subject to any disclaimer, the term of this patent is extended or adjusted under 35 U.S.C. 154(b) by 359 days.

(21) Appl. No.: 12/654,173

(22) Filed: Dec. 11, 2009

(65) Prior Publication Data

US 2011/0138884 A1 Jun. 16, 2011

(51) Int. Cl.
*G01M 3/02* (2006.01)
*G01M 3/20* (2006.01)

(52) U.S. Cl. .... 73/40.7; 73/40; 128/202.22; 128/206.21
(58) Field of Classification Search ............. 73/40, 40.7; 128/202.22, 206.21
See application file for complete search history.

(56) References Cited

U.S. PATENT DOCUMENTS

| | | | |
|---|---|---|---|
| 2,738,669 A * | 3/1956 | Silverman et al. | 73/40 |
| 3,486,366 A * | 12/1969 | Jackson | 73/40 |
| 4,146,025 A * | 3/1979 | Warncke et al. | 128/201.23 |
| 4,253,328 A * | 3/1981 | Pasternack | 73/40.7 |
| 4,796,467 A * | 1/1989 | Burt et al. | 73/168 |
| 5,289,819 A * | 3/1994 | Kroger et al. | 128/200.24 |
| 5,299,448 A * | 4/1994 | Maryyanek et al. | 73/40 |
| 6,125,845 A * | 10/2000 | Halvorsen et al. | 128/200.24 |
| 6,245,009 B1 * | 6/2001 | Travis et al. | 600/20 |
| 6,425,395 B1 * | 7/2002 | Brewer et al. | 128/202.22 |
| 6,435,009 B1 * | 8/2002 | Tilley | 73/40 |
| 6,820,616 B1 * | 11/2004 | Jordan | 128/202.11 |
| 6,955,170 B1 * | 10/2005 | Mullins et al. | 128/200.24 |
| 7,019,652 B2 * | 3/2006 | Richardson | 340/573.1 |
| 7,587,929 B2 * | 9/2009 | Zielinski et al. | 73/49.8 |
| 7,614,280 B1 * | 11/2009 | Gardner et al. | 73/40 |
| 7,988,452 B2 * | 8/2011 | Eiwen et al. | 434/270 |
| 2001/0007255 A1 * | 7/2001 | Stumpf | 128/200.24 |
| 2003/0200966 A1 * | 10/2003 | Frund, Jr. | 128/201.29 |

FOREIGN PATENT DOCUMENTS

DE 20121789 U1 * 6/2003
FR 1429204 * 1/1966

* cited by examiner

*Primary Examiner* — David Rogers
(74) *Attorney, Agent, or Firm* — Merek, Blackmon & Voorhees, LLC

(57) ABSTRACT

An apparatus for testing a protective mask. The apparatus includes a testing unit for testing a protective mask. The testing unit includes a headform upon which a protective mask to be tested is mounted. The testing unit is configured to take a sample of the challenge from two different locations about the protective mask. The testing unit may also be configured to inflate and deflate a neck seal protective mask when mounted on the headform prior to performing a mask leakage test to eliminate or significantly reduce pockets or folds that may hide a leak.

20 Claims, 6 Drawing Sheets

PORTABLE MULTI-FUNCTION SYSTEM FOR TESTING PROTECTIVE DEVICES

FIELD OF THE INVENTION

The present invention is directed to a device for testing protective masks used in both civilian and military applications. In particular, a preferred embodiment of the present invention is directed to a portable device that can perform one or more tests on a protective mask on site by relatively unskilled individuals. However, the present invention is not limited to portable devices nor is it limited to devices that are used only in on site applications.

BACKGROUND OF THE INVENTION

Protective masks have been used for sometime in both civilian and military applications. These protective masks are designed to protect the wearer from nuclear, biological, chemical agents, fumes, aerosols, gases and airborne contaminants. Hence, it is extremely important that the mask be properly tested to ensure that it will protect the wearer from these life threatening agents. One known system for testing protective masks is disclosed in U.S. Pat. No. 6,435,009 which is incorporated in its entirety herein.

The present invention is an improvement of the system disclosed in U.S. Pat. No. 6,435,009. In particular, a preferred embodiment of the present invention allows a single headform to be used to test two different types of mask seals, e.g., face seal protective masks and neck seal protective masks. Another aspect of a preferred embodiment of the present invention allows a vacuum to be pulled from two different locations about the protective mask while the protective mask is mounted on the headform. A further aspect of a preferred embodiment of the present invention is the elimination of pockets or folds formed when the protective mask is mounted on the headform prior to testing of the protective mask. The formation of one or more folds or pockets when the protective mask is mounted on the headform is extremely undesirable as a leak in the portion of the mask in which a pocket or fold is formed may go undetected by the test system. One type of mask particularly susceptible to the formation of one or more pockets or folds when mounted on a headform is a neck seal protective mask. A preferred form the present invention provides air under relatively high pressure to blow out any pocket or fold formed when the protective mask is mounted on the headform followed by the protective mask be subjected to a relatively high vacuum so that the protective mask is formed to the headform with out any folds or pockets.

OBJECTS AND SUMMARY OF THE INVENTION

An object of the present invention is to provide a novel and unobvious system for testing protective devices.

Another object of a preferred embodiment of the present invention is to provide a test system that can readily and accurately test different types of protective masks, e.g., neck seal protective masks and face seal protective masks.

A further object of a preferred embodiment of the present invention is to provide a test system that allows fluids to be pulled from two different locations about the protective mask.

Yet another object of a preferred embodiment of the present invention is to provide a test system that eliminates pockets or folds formed when the protective mask is mounted on the headform prior to testing of the protective mask.

Still a further object of a preferred embodiment of the present invention is to provide a headform that can readily be mounted on an existing test system to increase the capabilities of the test system.

Still another object of a preferred embodiment of the present invention is to provide a kit that can readily adapt an existing test system to supply air under pressure to a headform and subsequently place the headform under a vacuum so any folds or pockets formed when mounting the mask on the headform are eliminated.

It must be understood that no one embodiment of the present invention need include all of the aforementioned objects of the present invention. Rather, a given embodiment may include one or none of the aforementioned objects. Accordingly, these objects are not to be used to limit the scope of the claims of the present invention.

In summary, one embodiment of the present invention is directed to an apparatus for testing a protective mask. The apparatus includes a testing unit for testing a protective mask. The testing unit includes a headform upon which a protective mask to be tested is mounted. The testing unit further includes a pump having a pressure side and a vacuum side. The testing unit further includes at least first and second conduits operably associated with at least the vacuum side of the pump. The first conduit and the second conduit each have first and second ends. The second ends of each of the first conduit and the second conduit are open so that a fluid can be pulled through the second ends of the first conduit and the second conduit. The second end of the first conduit is disposed at a first location about the headform and the second end of the second conduit is disposed at a second location about the headform. The second location is spaced from the first location such that a fluid can be pulled from two different locations about a protective mask when mounted on the headform. The apparatus further includes a control system for operating the testing unit to perform at least a mask leakage test on the protective mask mounted on the headform. The control system has a first detection device for detecting a first parameter during the mask leakage test. The control system further includes at least one monitor for monitoring the first parameter to determine whether the protective mask passed the mask leakage test.

Another embodiment of the present invention is directed to an apparatus for testing a protective mask. The apparatus includes a testing unit for testing a protective mask. The testing unit includes a headform upon which a neck seal protective mask to be tested is mounted. The testing unit further includes a pump having a pressure side and a vacuum side. The apparatus further includes a control system for operating the testing unit to perform a mask leakage test on a neck seal protective mask mounted on the headform. The control system has a first detection device for detecting a first parameter during the mask leakage test. The control system further includes at least one monitor for monitoring the first parameter to determine whether the protective mask passed the mask leakage test. A first control valve is operably associated with the pressure side and a second control valve is operably associated with the vacuum side. When the first control valve is open a fluid under sufficient pressure is provided between the headform and a neck seal protective mask being tested to blow out any pockets or folds that may have been created when the neck seal protective mask is seated on the headform prior to testing the neck seal protective mask for leaks. When the second valve is open a vacuum is created to evacuate excess fluid from between the neck seal protective mask and the headform to eliminate pockets or folds between the headform and neck seal protective mask when the neck seal protective mask is tested.

The above summary describes preferred forms of the present invention and is not in any way to be construed as limiting the claimed invention to the preferred forms.

DETAILED DESCRIPTION OF THE PREFERRED EMBODIMENTS OF THE INVENTION

The preferred forms of the invention will now be described with reference to FIGS. 1-9. The appended claims are not limited to the preferred forms and no term and/or phrase used herein is to be given a meaning other than its ordinary meaning unless it is expressly stated otherwise.

FIGS. 1 through 9

Figure 1:
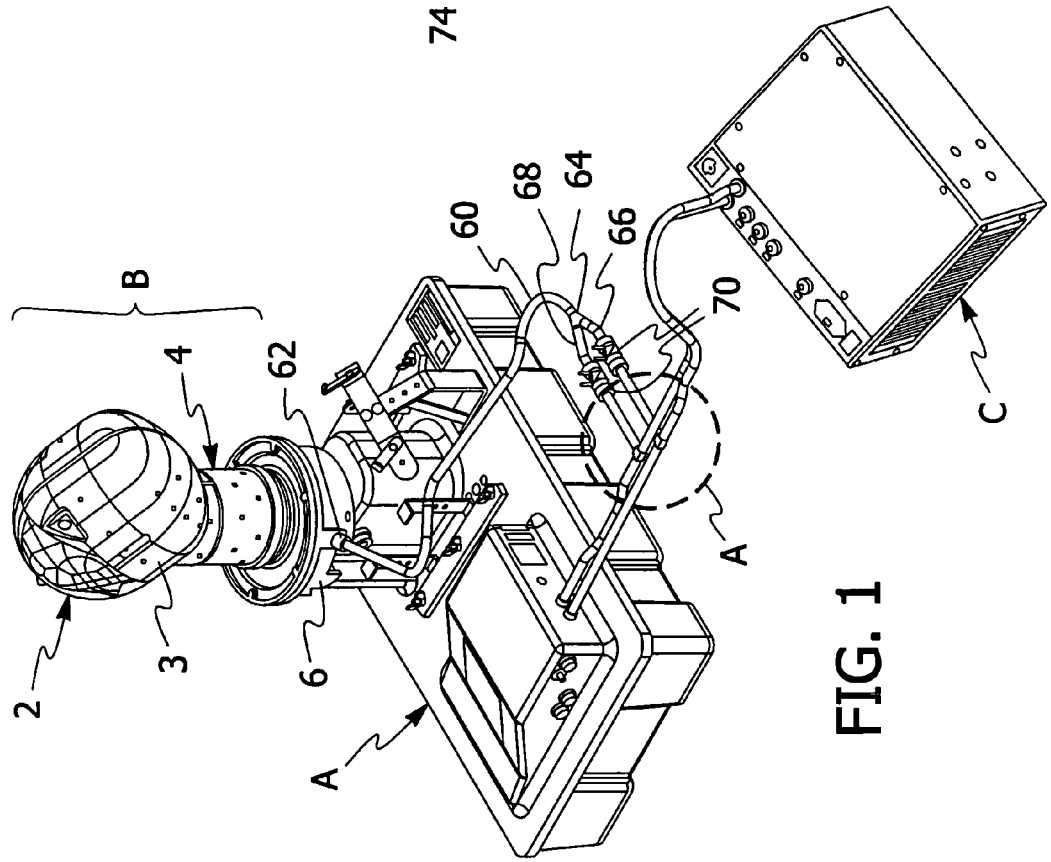
FIG. 1 is a perspective view a preferred embodiment of the present invention.
Figure 9:
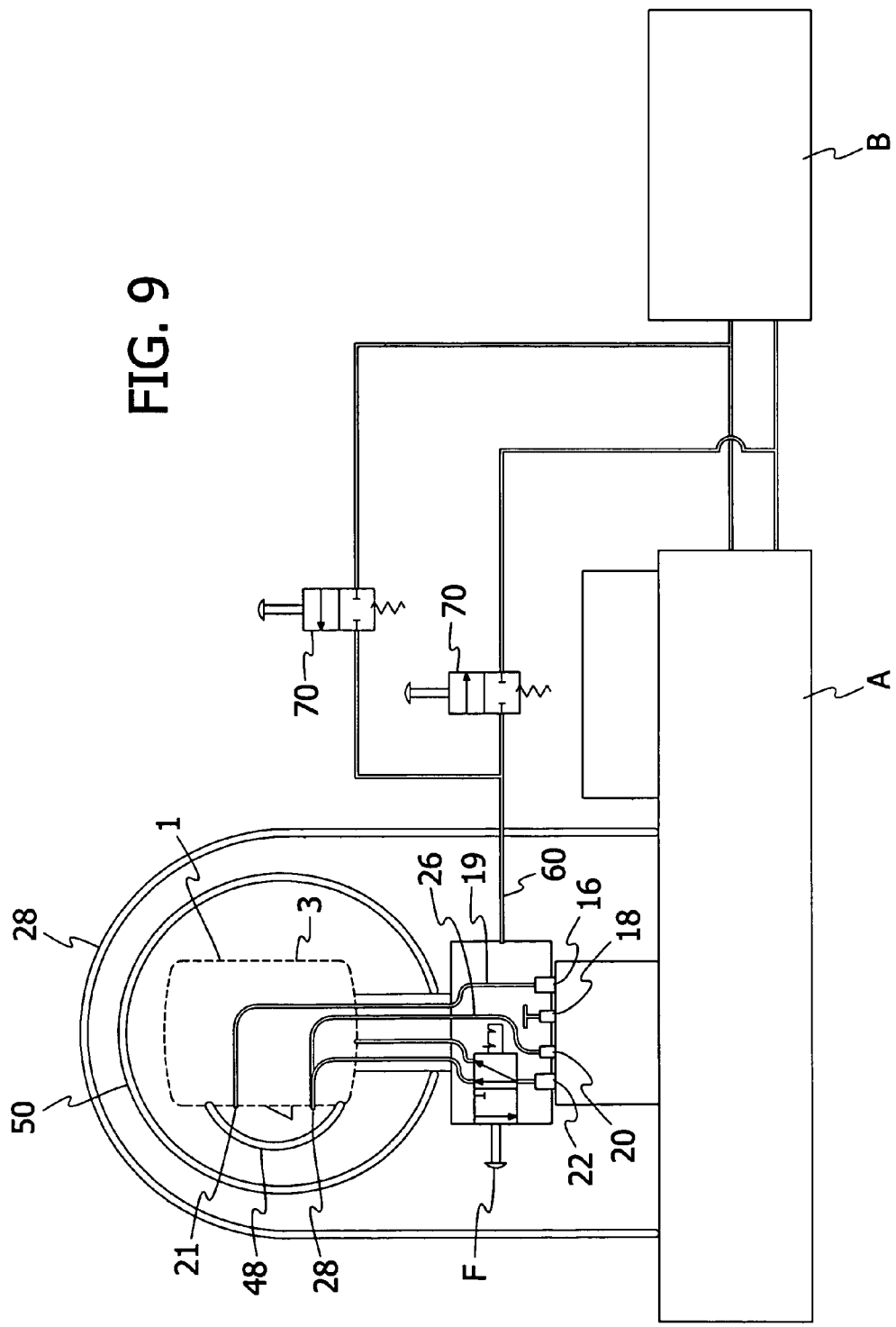
FIG. 9 is a schematic diagram of various aspects of a preferred form of the present invention.

Referring to FIG. 1, a preferred form of the portable, multi-function testing system includes a main housing A, a headform B mounted on main housing A and an auxiliary housing C. Referring to FIG. 9, headform B preferably has a large hollow cavity 1 and a thin exterior wall 3. It should be noted that headform B can be formed from multiple pieces. An aerosol generator is preferably attached to the exterior of main housing A in a similar manner to that disclosed in U.S. Pat. No. 6,435,009. A protective transport case similar to that disclosed in U.S. Pat. No. 6,435,009 may be used to transport the preferred form of the testing system described herein.

Figure 3:
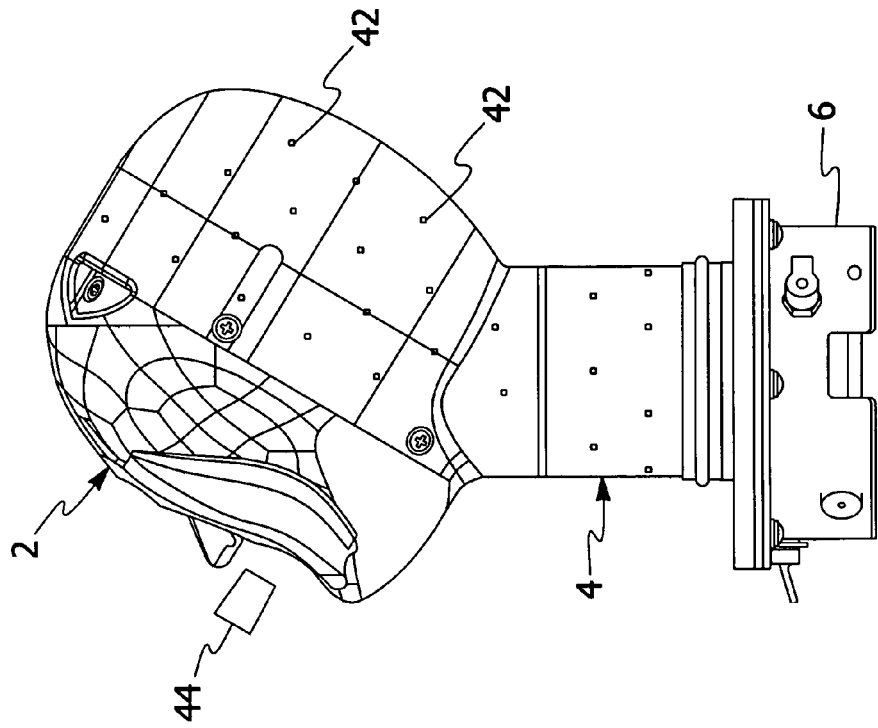
FIG. 3 is a perspective view of a preferred form of the headform. Also illustrated in this figure is the means for reducing flow through the mouth opening in the headform when a neck seal mask is being tested just prior to insertion in the mouth opening of the headform.
Figure 4:
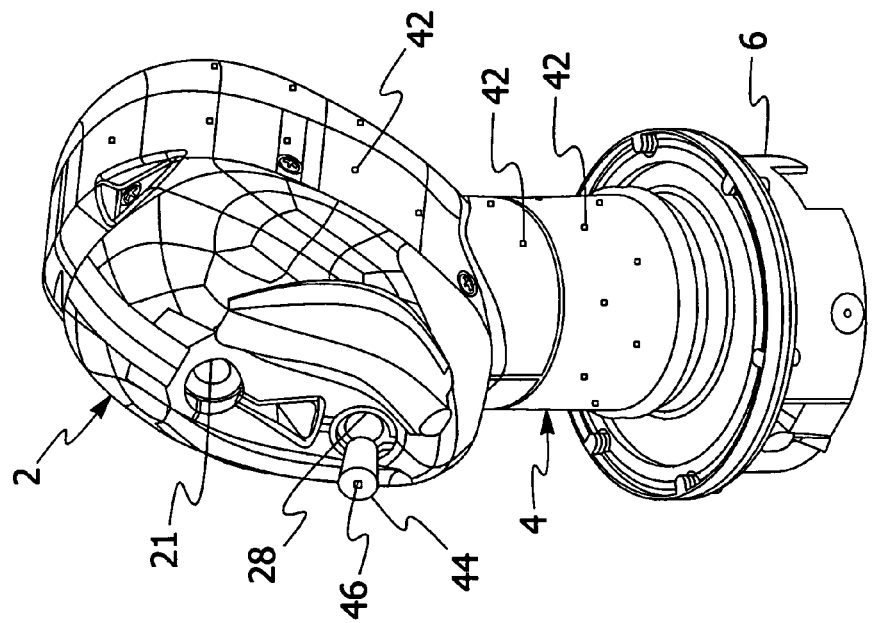
FIG. 4 is an elevational view of the headform illustrated in FIG. 3.
Figure 6:
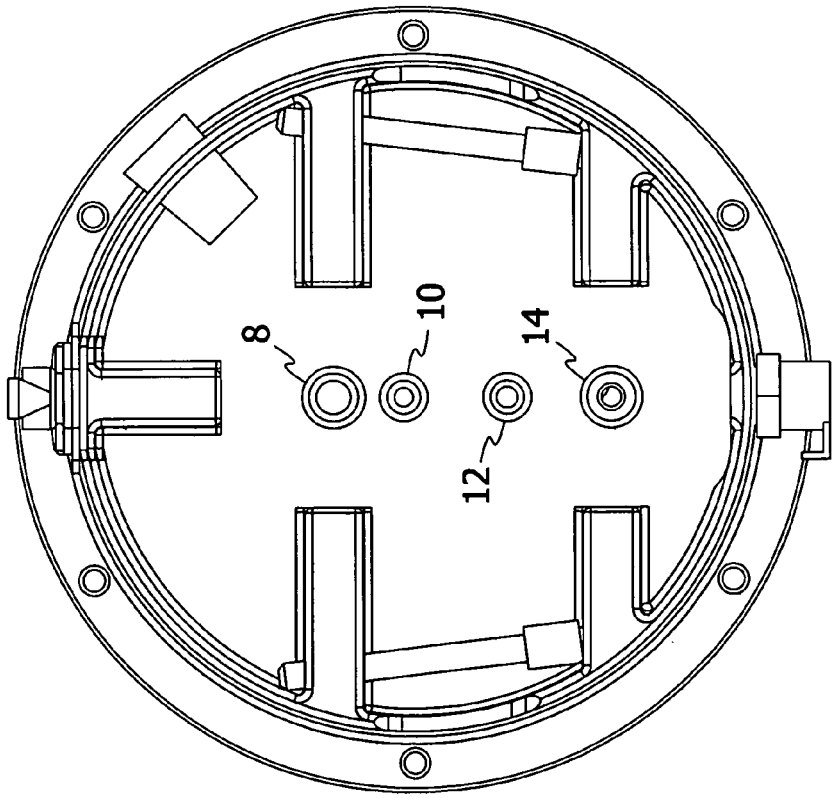
FIG. 6 is a bottom view of the base of the preferred form of the headform.

Referring to FIGS. 3 and 4, headform B includes a head portion 2, neck portion 4 and base 6. Preferably, headform B is removably secured to main housing A. Referring to FIG. 6 four openings or female ports 8, 10, 12 and 14 extend through base 6 and receive four corresponding male ports 16, 18, 20 and 22 (shown schematically in FIG. 9). The four male ports are well known as they are exactly the same as the JSMLT test system sold by Air Techniques International, a Division of Hamilton Associates, Inc.

Figure 5:
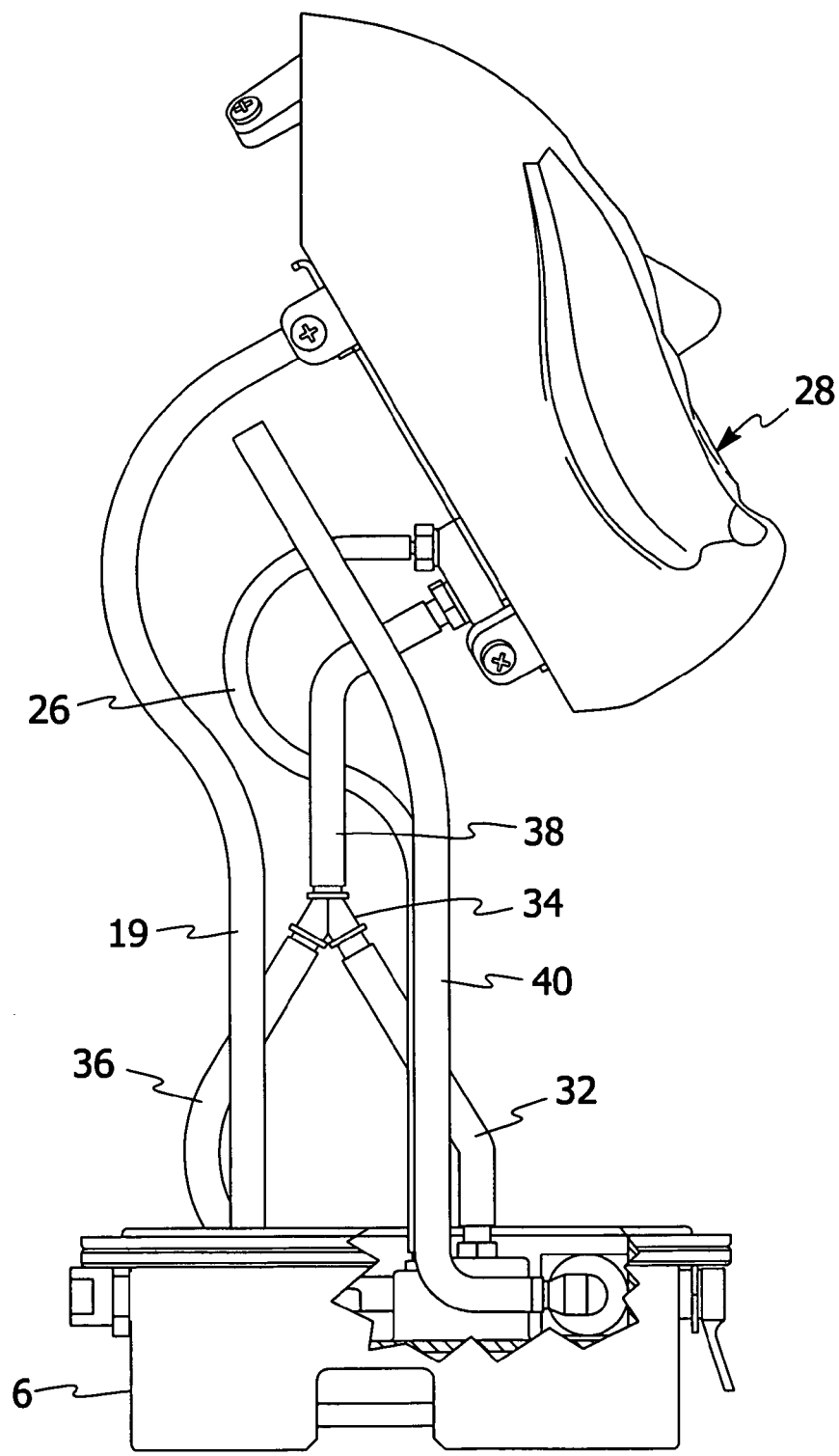
FIG. 5 is a fragmentary view of a preferred form of headform with portions thereof removed so that features of the preferred form of the invention can be readily seen.

Opening 8 preferably receives the clean air supply male port 16 of the JSMLT test system. Referring to FIGS. 5 and 9, a conduit 19 connects male port 16 to eye port 21 of headform B so that clean air can be constantly supplied at 16 lpm during testing of the protective mask. More specifically, clean air is pulled through intake filter 23 illustrated in FIG. 8 during the mask leakage test in which the protective mask is subject to a constant vacuum/resistance of 6 inches of water column. The manner of supplying clean air at this rate during testing is as utilized in the JSMLT test system.

Opening 10 preferably receives the seal inflate male port 18 of the JSMLT test system. Male port 18 is shown in FIG. 9 as being closed off because headform B preferably does not include the inflatable seal used in the headform of the JSMLT test system when testing a face seal protective mask. However, if desired, headform B can be provided with an inflatable seal similar to that of the JSMLT. In such instances, the inflatable seal may be inflated using the controls disclosed in U.S. Pat. No. 6,435,009 for the inflation of a seal in the headform.

Figure 7:
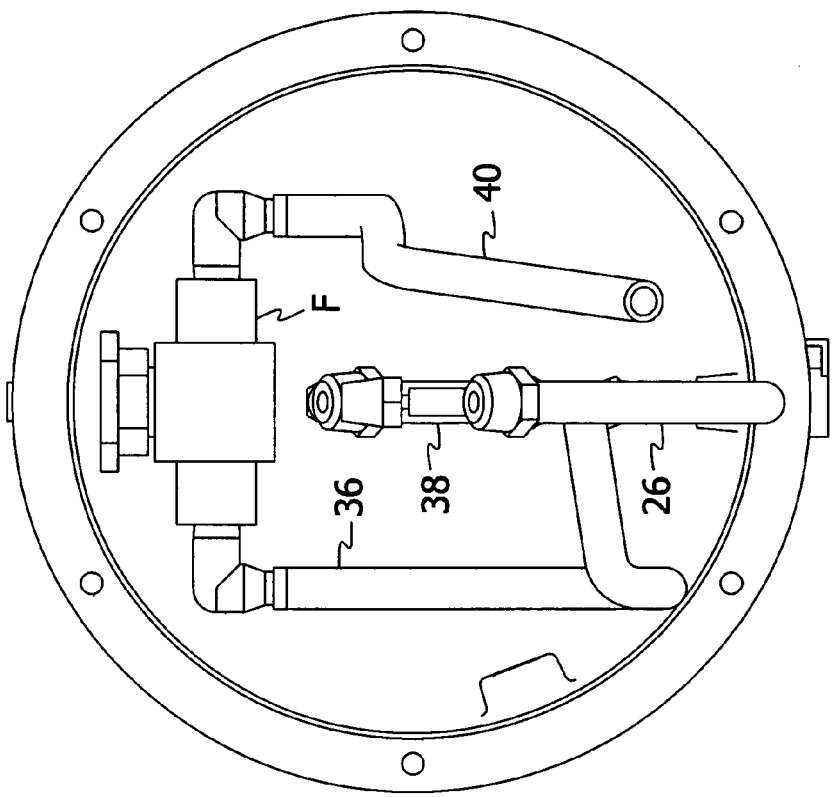
FIG. 7 is top view of the preferred form of the headform with portions thereof removed so that features of the preferred form of the invention can be readily seen.
Figure 8:
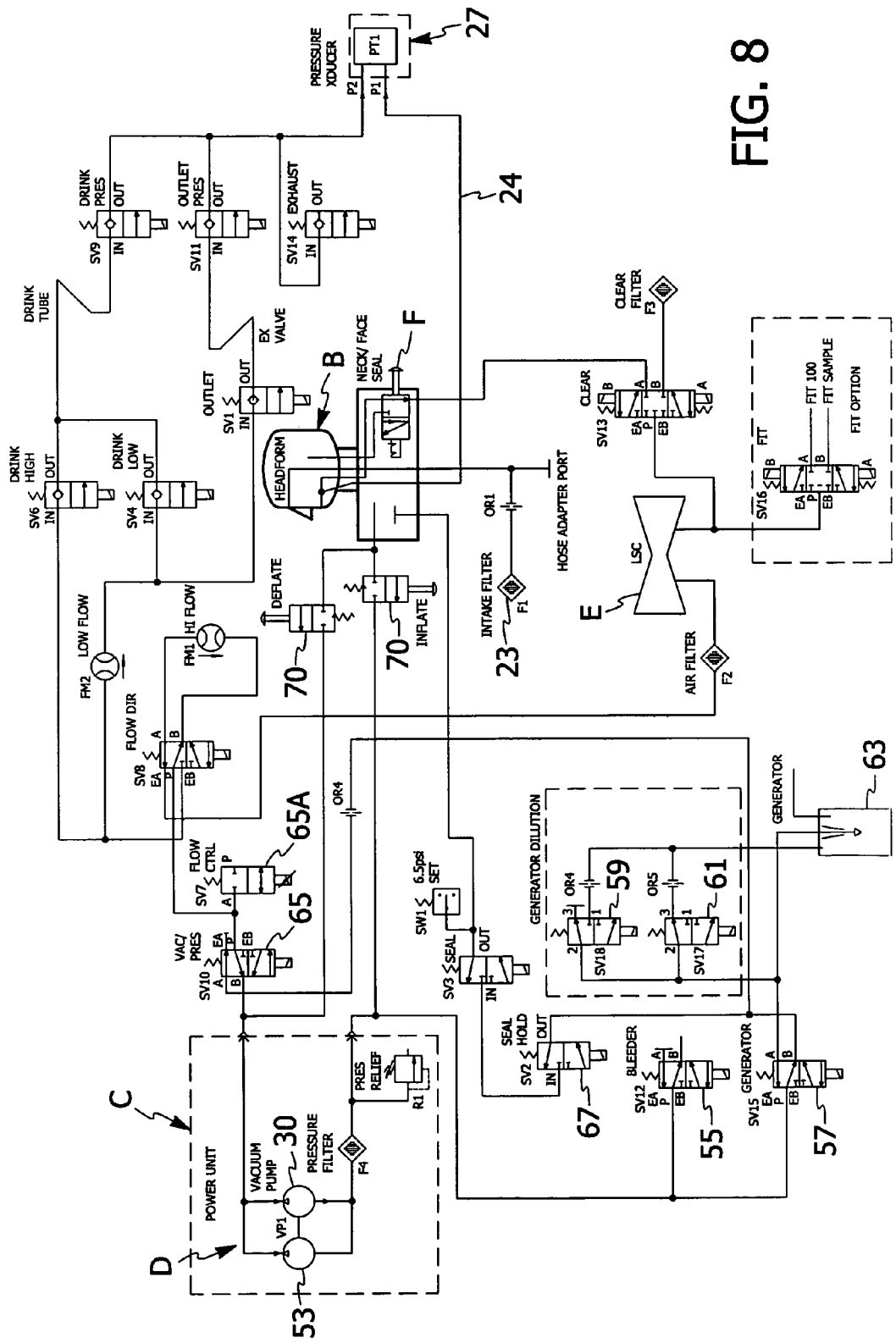
FIG. 8 is a schematic diagram of the pneumatic controls of the preferred embodiment of the present invention.

Opening 12 preferably receives pressure tap male port 20. Port 20 is connected to pressure transducer 27 via line 24 as illustrated in FIG. 8. Referring to FIGS. 5 and 9, a conduit 26 connects port 20 to the mouth opening 28 in headform B. In this manner, air pressure can be monitored during testing of the protective mask as explained and disclosed in U.S. Pat. No. 6,435,009. Opening 14 receives sample male port 22. A fluid sample is pulled through port 22 by the vacuum created by the vacuum side 30 of dual rotary pump D. While the preferred pump system is a single rotary pump have a vacuum side and a pressure side, the phrase "a pump system having a pressure side and a vacuum side" as used herein also encompasses two pumps, one of which is used to create the pressure side and the other of which is used to create the vacuum side. Preferably, dual rotary pump D and the power supply are housed in auxiliary housing C as explained and disclosed in U.S. Pat. No. 6,435,009. Referring to FIG. 8, the sample subsequently passes through photometer E to determine if an unacceptable level of challenge concentration (preferably aerosol concentration) is present signifying a leak in the protective mask. The pneumatics including but not limited to the solenoid control valves for pulling a sample through port 22 is similar to that disclosed in U.S. Pat. No. 6,435,009 as is seen when comparing FIG. 9 of U.S. Pat. No. 6,435,009 with FIG. 8 of the subject disclosure. However, one important difference is the addition of valve F. Valve F is preferably disposed in base 6 of headform B as shown in FIG. 7 for the reasons that are more fully discussed below. Another important difference is the addition of inflation and deflation valves 70 for the reasons more fully discussed below.

Referring to FIGS. 5 and 9, a conduit 32 is connected at one end to sample male port 22 and at the other end to y-connector 34. Referring to FIGS. 5 and 7, conduit 36 is connected at one end to y-connecter 34 and at the other end to one side of valve F. Conduit 38 at one end is connected to y-connector 34 and at the other end to mouth opening 28. Conduit 40 is connected at one end to valve F and is open at the other end. As seen in FIGS. 5 and 9, the open upper end of conduit 40 is preferably located in hollow cavity 1 so that the open upper end is removed from the exterior wall 3 of headform B. When valve F is in an open position as shown in FIG. 9, a fluid sample is pulled through both conduit 40 and conduit 38.

As shown in FIGS. 3 and 4, a plurality of openings 42 are formed in the exterior wall of headform B. The number, size and spacing of the openings may be varied as desired. It should be noted that it may be desirable to make the openings located a greater distance from the open end of conduit 40 larger than those openings that are located closer to the open end of conduit 40.

The openings 42 are in communication with hollow cavity 1 to allow a sample fluid to be taken about each of the openings 42. Specifically, when the mask is under a constant vacuum, a fluid is successively pulled through openings 42, conduit 40, valve F, conduit 36, y-connector 34, conduit 32 and male port 22. At the same time that a sample is being pulled though openings 42 into conduit 40, a sample about the mouth opening 28 is successively pulled through conduit 38, y-connector 34, conduit 32 and male port 22. As previously explained, the sample is passed from port 22 to the photometer in a similar manner to that disclosed in U.S. Pat. No. 6,435,009 so that it can be determined whether the sample has an unacceptable challenge concentration signifying a leak in the mask. It should be noted that CNC devices and other means for detecting challenge concentration may be used instead of a photometer.

Valve F is open when a neck seal protective mask is undergoing a mask leakage test. In this manner, a fluid sample can be taken from multiple different locations about the protective mask. Preferably, prior to performing the mask leakage test on a neck seal protective mask an elastic plug 44 is inserted in mouth opening 28. Plug 44 includes an opening 46 extending therethrough. In this manner, the flow of sample fluid through the mouth opening 28 is reduced during a mask leakage test of a neck seal protective mask.

Valve F is closed when a face seal protective mask is undergoing a mask leakage test. In this scenario, a fluid sample is pulled successively through the mouth opening 28 (mouth opening 28 is free of plug 44), conduit 38, y-connector 34, conduit 32 and port 22. In this scenario, a fluid cannot be pulled through conduit 40 as conduit 40 has been effectively isolated from the vacuum side 30 of pump D.

FIG. 9 schematically illustrates a face seal protective mask 48 mounted on headform B. Similarly, a neck seal protective mask 50 mounted on headform B is shown schematically in FIG. 9. It should be noted that only one mask is mounted on the headform B during a given test. A shroud 52, illustrated in FIG. 9, is typically placed over a protective mask during a mask leakage test in which the protective mask is subjected to a challenge, e.g., aerosol. The shroud 52 acts in a well known manner to maintain the challenge about the protective mask.

By configuring headform B as disclosed herein, headform B may be readily inserted on an existing JSMLT test system without any significant modification to the JSMLT test system to test at least two different types of protective masks, e.g., face seal protective masks and neck seal protective masks. It should be noted that while headform B may be formed as a fully assembled kit for immediate insertion on any existing JSMLT test system, it may be modified to fit any suitable testing system or may be installed at time of manufacture.

The preferred form of the present invention, like the JSMLT test system, can perform various tests on a protective mask including a mask leakage test, a mask fit test, an outlet valve test, and three drink train tests (i.e., drink train seat test, drink train leakage test and drink train flow test). It should be noted that the mask fit test, outlet valve test and three drink train tests may be performed using the same procedure and pneumatics as disclosed in U.S. Pat. No. 6,435,009 or used in the JSMLT test system. It should be noted that for those tests requiring the drink seat valve to be unseated and/or reseated, it is preferred that this valve be manually unseated and reseated in a similar manner to the JSMLT test system as opposed to the automatic means disclosed in U.S. Pat. No. 6,435,009. Hence, the controls for the automatic means disclosed in U.S. Pat. No. 6,435,009 have been removed from the schematic diagram illustrated in FIG. 8.

An aerosol challenge may be generated by using the same procedure and pneumatics as disclosed in U.S. Pat. No. 6,435,009 or used in the JSMLT test system and, therefore, this procedure will not be described in detail. However, an aerosol challenge is generated in the following manner. Air under pressure is supplied from the pressure side 53 of pump D. Solenoid valve 55 is typically open and exhausted to atmosphere. However, when it is desired to generate an aerosol challenge, valve 55 is closed and solenoid valve 57 is closed so that air under pressure is supplied to solenoid valves 59 and 61 that feed aerosol generator 63. Either valve 59 or valve 61 can be closed to dilute the aerosol. As shown in FIG. 8, aerosol is only being supplied through valve 61. However, it should be noted that both valves can supply air under pressure to generator 63 at the same time. When valve 57 is open air under pressure is passed through either a series of valves to inflate the seal on a headform having such a seal or is directed to solenoid valve 65 to supply pressurized air as is need to perform the outlet valve test and the three drink train tests. Solenoid valve 65 functions in a similar fashion to solenoid valve 102 in U.S. Pat. No. 6,435,009 to allow the system to switch between vacuum and pressure. Solenoid valve 65A is similar to solenoid valve 106 in U.S. Pat. No. 6,435,009 and is usually exhausted to atmosphere. Through solenoid valve 65A the strength of the vacuum that the headform B is subjected to can be varied. Because headform B does not use an inflatable seal, solenoid valve 67 is closed to prevent air from passing through valve 67. Hence, when valve 57 is open air is directed to solenoid valve 65 as valve 67 is closed.

Figure 2:
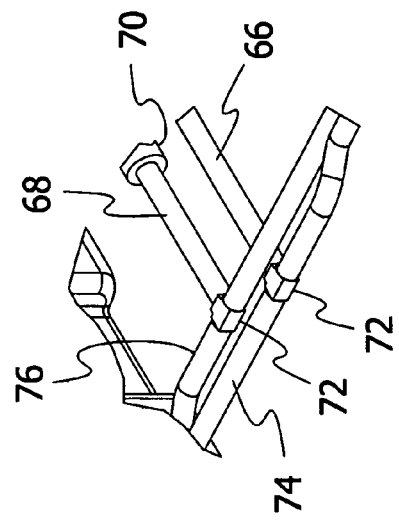
FIG. 2 is an enlarged perspective view of the portion of FIG. 1 identified by the dashed line circle A.

Referring to FIGS. 1, 2 and 9, the inflation/deflation feature of a preferred embodiment of the present invention will now be described. As previously explained, it is extremely undesirable to have pockets or folds formed when the protective mask is mounted on the headform of a given test unit as leaks in the mask may go undetected. Neck seal protective masks are susceptible to the formation of pockets or folds when mounted on a headform.

The preferred form of the present invention is a kit that can readily adapt an existing JSMLT test system to have the inflation/deflation feature of a preferred form of the present invention. The kit includes a conduit 60 that has a quick disconnect coupling 62 for connecting and disconnecting conduit 60 to headform B. It should be noted that any suitable coupling maybe used for coupling conduit 60 to headform B so that conduit 60 is in fluid communication with hollow cavity 1 of headform B. The other end of conduit 60 is connected to a y-connector 64. Conduits 66 and 68 are connected to the opposite end of y-connector 64. Conduits 66 and 68 each include a flow control valve 70. In the open position, control valve 70 allows air to pass therethrough and in the closed position prevents air from passing therethrough. Referring to FIG. 2, conduits 66 and 68 each also include a t-connector 72. The final components of the kit are conduits 74 and 76.

When the kit is to be used in an existing JSMLT test system, headform B is removably mounted on main housing A. Any suitable fasteners may used to removably mount headform B to main housing A. Conduit 60 is connected to hollow cavity 1 via quick disconnect coupling 62. T-connecters are connected to the existing pressure and vacuum lines coming from the auxiliary housing C of the JSMLT test system as shown in FIGS. 1 and 2. The free ends of conduits 74 and 76 are connected to ports on main housing A.

After a neck seal protective mask has been mounted on headform assembly B but prior to performing a mask leakage test, valve 70 connected to the pressure side of pump D housed in auxiliary housing C is opened to provide air at 10 psi and 20 lpm to headform B. The pressurized air passes through openings 42 in headform B to blow out any pockets or folds. Subsequently, valve 70 on the pressure side of pump D is closed and valve 70 on the vacuum side of pump D is open to create a vacuum/resistance of 20 inches of mercury at 20 lpm to evacuate any excess fluid between the neck seal protective mask and headform B. By quickly inflating and deflating the neck seal protective mask, it is possible to eliminate or significantly reduce any pockets or folds that could prevent a leak from being detected. When the protective mask is undergoing testing, both valves 70 are closed. While two valves 70 are preferred, a single valve could be used where the valve has three positions for vacuum, pressure and no flow therethrough, i.e., closed.

It should be noted that while the inflation/deflation feature is illustrated as a kit for an existing JSMLT test system, the kit can be modified to fit any suitable test system. Further, the inflation/deflation feature may be provided in any suitable test system when originally manufactured.

While this invention has been described as having a preferred design, it is understood that the preferred design can be further modified or adapted following in general the principles of the invention and including but not limited to such departures from the present invention as come within the known or customary practice in the art to which the invention pertains. The claims are not limited to the preferred embodiment and have been written to preclude such a narrow construction using the principles of claim differentiation.

We claim:

1. An apparatus for testing a protective mask, comprising:
   (a) a testing unit for testing a protective mask, said testing unit including a headform upon which a protective mask to be tested is mounted, said testing unit further including a pump system having a pressure side and a vacuum side, said testing unit further including at least first and second conduits operably associated with at least said vacuum side of said pump system, said first conduit and said second conduit each having first and second ends, said second ends of each of said first conduit and said second conduit being open so that a fluid can be pulled through said second ends of said first conduit and said second conduit, said second end of said first conduit being disposed at a first location about said headform and said second end of said second conduit being disposed at a second location about said headform, said second location being spaced from said first location such that a fluid can be pulled from two different locations about a protective mask when mounted on said headform;
   (b) a control system for operating said testing unit to perform at least a mask leakage test on said protective mask mounted on said headform, said control system having a first detection device for detecting a first parameter during the mask leakage test; and,
   (c) said control system further including at least one monitor for monitoring said first parameter to determine whether the protective mask passed the mask leakage test.

2. An apparatus as set forth in claim 1, wherein:
   (a) said headform includes a hollow internal cavity and an exterior wall, a mouth opening extends through said exterior wall of said headform, said headform further includes at least first and second surface openings that extend through said exterior wall of said headform and communicate with said internal cavity, said first surface opening and said second surface opening are spaced from said mouth opening, said first surface opening is spaced from said second surface opening, said second end of said first conduit being connected to said mouth opening so that a fluid can be pulled through said mouth opening and pass through said first conduit, said second end of said second conduit extends into said hollow cavity so that a fluid can be pulled through said at least two surface openings and pass through said second conduit.

3. An apparatus as set forth in claim 2, wherein:
   (a) said test unit further includes a valve and a third conduit, said valve is operably associated with said first conduit, said second conduit and said third conduit such that when said valve is in a first position fluid is pulled through both said first conduit and second conduit and passes into said third conduit and when said valve is in a second position fluid is pulled through said first conduit and passes into said third conduit but fluid cannot be pulled through said second conduit.

4. An apparatus as set forth in claim 3, wherein:
   (a) said first end of said second conduit is connected to a first end of said valve.

5. An apparatus as set forth in claim 4, wherein:
   (a) said test unit includes a connector having first, second and third connection ports, said first end of said first conduit is connected to said first connection port, a second end of said third conduit is connected to said second connection port and a second end of a fourth conduit is connected to said third connection port and a first end of said fourth conduit is connection to a second end of said valve so that when said valve is in said first position a fluid is pulled through said first conduit into said third conduit while a fluid is successively pulled through said second conduit, said fourth conduit and into said third conduit.

6. An apparatus as set forth in claim 5, wherein:
   (a) said headform includes a base having a vacuum port, said first end of said third conduit is connected to said vacuum port of said base of said headform.

7. An apparatus as set forth in claim 6, wherein:
   (a) said connector and said valve are disposed in said base of said headform.

8. An apparatus as set forth in claim 3, wherein:
   (a) said headform is configured to receive a face seal protective mask or a neck seal protective mask, said valve is in said first position when a neck seal protective mask is being tested and in said second position when a face seal protective mask is being tested.

9. An apparatus as set forth in claim 8, further including:
   (a) means for reducing the flow through said mouth opening in said headform when a neck seal mask is being tested.

10. An apparatus for testing a protective mask, comprising:
    (a) a testing unit for testing a protective mask, said testing unit including a headform upon which a neck seal protective mask to be tested is mounted, said testing unit further including a pump system having a pressure side and a vacuum side,
    (b) a control system for operating said testing unit to perform a mask leakage test on a neck seal protective mask mounted on said headform, said control system having a first detection device for detecting a first parameter during the mask leakage test;
    (c) said control system further including at least one monitor for monitoring said first parameter to determine whether the protective mask passed the mask leakage test; and, (d) at least a first control valve being operably associated with said pressure side and said vacuum side, when said at least a first control valve is in a first position a fluid under sufficient pressure is provided between said headform and a neck seal protective mask being tested to blow out any pockets or folds that may have been created when the neck seal protective mask is seated on said headform prior to testing the neck seal protective mask for leaks, when said at least a first control valve is in a second position a vacuum is created to evacuate excess fluid from between the neck seal protective mask and said headform to eliminate pockets or folds between said headform and neck seal protective mask when the neck seal protective mask is tested.

11. An apparatus as set forth in claim 10, wherein:
(a) when said first control valve is open air is provided at approximately 10 psi and 20 lpm; and,
(b) when said second control valve is open a vacuum of approximately 20 inches of mercury and 20 lpm is created to rapidly evacuate excess fluid between the neck seal protective mask and said headform.

12. An apparatus as set forth in claim 10, wherein:
(a) said headform includes a head portion, a neck portion and a base, said head portion, said neck portion and said base portion are in fluid communication with each other, said head portion and said neck portion each having a plurality of openings formed therein.

13. An apparatus as set forth in claim 12, further including:
(a) a first conduit operably associated with said at least a first control valve for providing fluid under pressure to said headform when said at least first control valve is in a first position and creating a vacuum in said headform when said at least first control valve is in a second position.

14. An apparatus as set forth in claim 13, wherein:
(a) a first end of said first conduit is connected to said base of said headform and a second end of said first conduit is connected to a first port of a y-connector.

15. An apparatus as set forth in 10, wherein:
(a) said test unit includes a first housing upon which the headform is mounted, said at least a first control valve is located outside of said housing and outside of said headform so that an operator can readily access said at least a first control valve.

16. An apparatus as set forth in claim 15, wherein:
(a) said test unit includes a second housing for storing said pump, at least one conduit extends between said second housing and said headform to provide fluid under pressure to said headform without the fluid passing through said first housing.

17. An apparatus as set forth in claim 10, wherein:
(a) said headform is configured so that a face seal protective mask or a neck seal protective mask may be mounted on said headform.

18. An apparatus as set forth in claim 10, wherein:
(a) a first control valve is operably associated with said pressure side and a second control valve is operably associated with said vacuum side, said second control valve is connected to said vacuum side upstream of a third control valve, said third control valves regulates the strength of a vacuum created in said headform when said neck seal protective mask is undergoing a mask leakage test.

19. An apparatus as set forth in claim 10, wherein:
(a) said first parameter is aerosol concentration.

20. An apparatus as set forth in claim 10, wherein:
(a) said at least one monitor is a photometer.

* * * * *

UNITED STATES PATENT AND TRADEMARK OFFICE
CERTIFICATE OF CORRECTION

| | | |
|---|---|---|
| PATENT NO. | : 8,196,454 B2 | Page 1 of 1 |
| APPLICATION NO. | : 12/654173 | |
| DATED | : June 12, 2012 | |
| INVENTOR(S) | : Eric Hanson et al. | |

It is certified that error appears in the above-identified patent and that said Letters Patent is hereby corrected as shown below:

Column 1, Line 45, "form the" should be -- form of the --

Column 3, Line 10, "view a" should be -- view of a --

Column 3, Line 26, "is top" should be -- is a top --

Column 4, Line 28, "pump have a" should be -- pump having a --

Column 6, Line 18, "is need to" should be -- is needed to --

Column 6, Line 44, "maybe" should be -- may be --

Column 6, Line 57, "may used" should be -- may be used --

Claim 15, Line 5, "in 10" should be -- in claim 10 --

Claim 18, Line 26, "control valves regulates" should be -- control valve regulates --

Signed and Sealed this
Fourteenth Day of August, 2012

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 8,196,454 B2 | Page 1 of 1 |
| APPLICATION NO. | : 12/654173 | |
| DATED | : June 12, 2012 | |
| INVENTOR(S) | : Eric Hanson et al. | |

It is certified that error appears in the above-identified patent and that said Letters Patent is hereby corrected as shown below:

Column 1, Line 45, "form the" should be -- form of the --

Column 3, Line 10, "view a" should be -- view of a --

Column 3, Line 26, "is top" should be -- is a top --

Column 4, Line 28, "pump have a" should be -- pump having a --

Column 6, Line 18, "is need to" should be -- is needed to --

Column 6, Line 44, "maybe" should be -- may be --

Column 6, Line 57, "may used" should be -- may be used --

Column 10, Line 5 (Claim 15, Line 1) "in 10" should be -- in claim 10 --

Column 10, Line 26 (Claim 18, Line 6) "control valves regulates" should be
-- control valve regulates --

This certificate supersedes the Certificate of Correction issued August 14, 2012.

Signed and Sealed this
Fourth Day of September, 2012

David J. Kappos
*Director of the United States Patent and Trademark Office*